Figure 1:
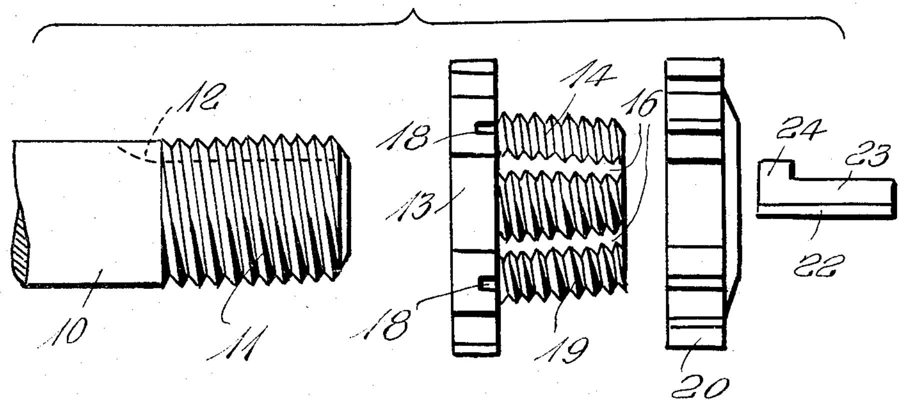

LOCKNUT ASSEMBLY COMPRISING SLEEVE WITH TAPERED EXTERNAL THREAD BEING KEYED TO BOLT AND ENVELOPED BY A RETENTION NUT

Filed Sept. 16, 1957 2 Sheets-Sheet 1

INVENTOR
LEO SCHWAIGER,
BY Felix A. Russell
ATTORNEY

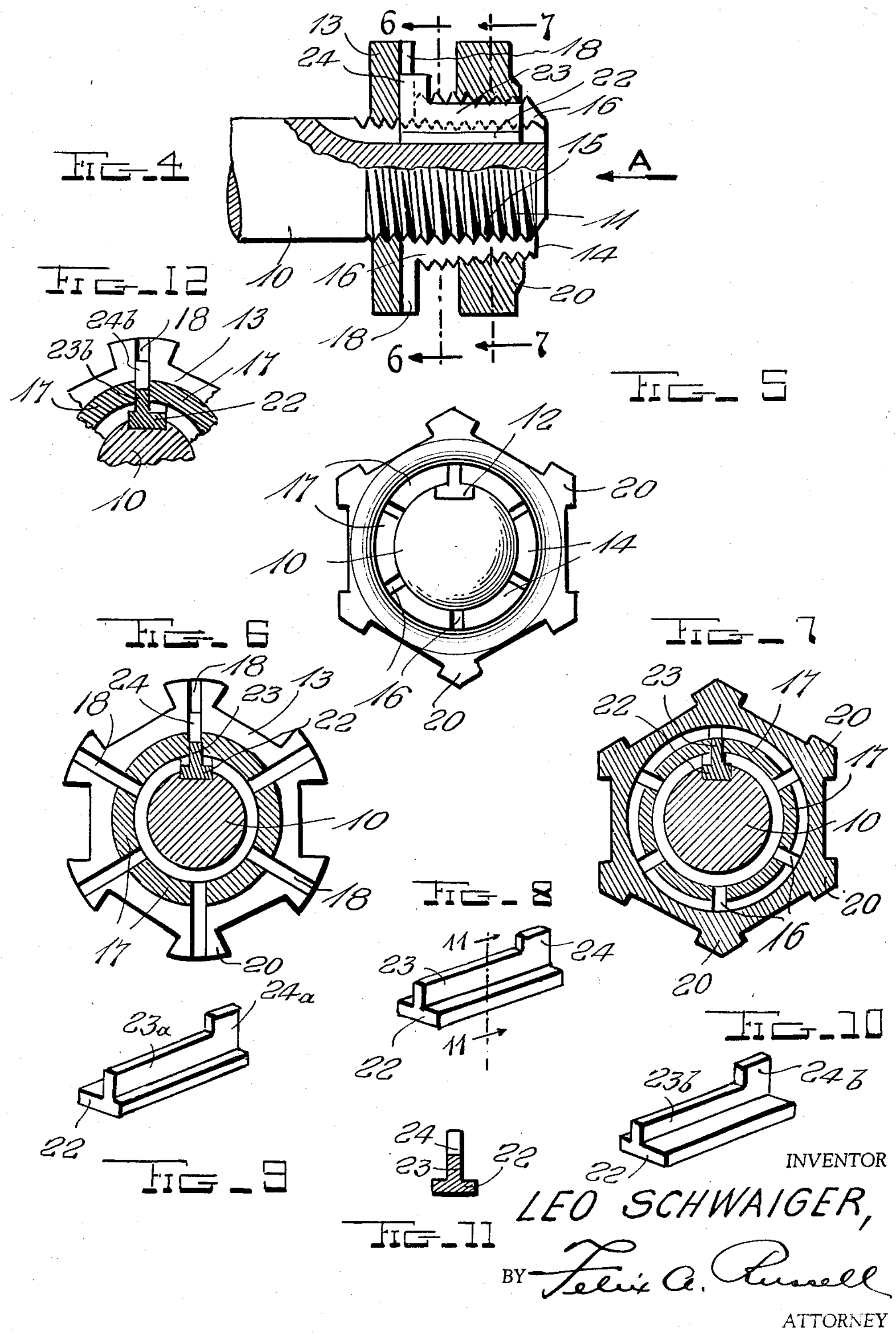
INVENTOR
LEO SCHWAIGER,
BY Felix A. Russell
ATTORNEY

United States Patent Office 2,925,842

Patented Feb. 23, 1960

2,925,842

LOCKNUT ASSEMBLY COMPRISING SLEEVE WITH TAPERED EXTERNAL THREAD BEING KEYED TO BOLT AND ENVELOPED BY A RETENTION NUT

Leo Schwaiger, Cullman, Ala.

Application September 16, 1957, Serial No. 684,019

1 Claim. (Cl. 151—8)

The present invention relates to a keyed locknut and it consists in the combinations, constructions and arrangements of parts herein described and claimed.

Generally there is provided a keyed locknut construction which consists of a nut having an integrally formed tapered sleeve extending from one side therefrom. Both the nut and sleeve are interiorly threaded and the sleeve is provided with a series of circumferentially spaced longitudinally extending slots which divide the same into a plurality of fingers. Each of the slots in the sleeve communicates with a radially extending groove formed in the adjacent face of the nut. The exterior surface of the sleeve is threaded to receive a locking ring having an interiorly threaded tapering opening for threadable reception on the sleeve. The device is adapted to be used upon a bolt or the like having a longitudinally extending groove formed in the outer end thereof. A novel key is provided with a base which is slidably received in the groove in the bolt and with an upwardly extending head formed integrally therewith and which is adapted to be received in one of the radial grooves in the nut. The device is such that when the nut has been approximately placed in its desired position upon the bolt, it may then be turned until the nearest longitudinal slot in the sleeve registers with the groove in the bolt whereupon a key may be inserted longitudinally through the groove in the bolt and the registering slot in the sleeve until the head of the key is positioned in the adjacent radial groove whereupon the ring may be threaded upon the sleeve to lock the fingers thereof into secure engagement with the threaded portion of the bolt. A plurality of keys is provided, three variations being shown in the accompanying drawings. In one case the key is provided with a body which extends centrally upwardly from the base while in the two other cases the body extends upwardly from one or the other side portions of the base, thus allowing for minute adjustments of the nut with respect to the groove in the bolt by allowing the slots in the sleeve to be slightly out of registry on one side or the other of the slot in the bolt, it being apparent that the particular key may be selected for the desired positioning of the nut with respect to the bolt and thus providing, in effect, with the six slots and three keys as shown in the embodiment illustrated in the drawings, eighteen possible adjustments of the nut with respect to the bolt for each convolution of the threads upon the bolt.

It is accordingly an object of the invention to provide a novel keyed locknut construction.

Another object of the invention is to provide a device of the character set forth which is simple in construction, inexpensive to manufacture and yet effective and efficient in use.

Still another object of the invention is to provide, in a device of the character set forth, a locknut construction having a multiplicity of possible adjusted locked positions with respect to a bolt with which it may be used.

Another object of the invention is to provide, in a device of the character set forth, a novel key forming a part of the invention.

Still another object of the invention is the provision, in a device of the character set forth, of novel means for permitting the removal of a key from a nut, both key and nut forming parts of the present invention.

Figure 2:
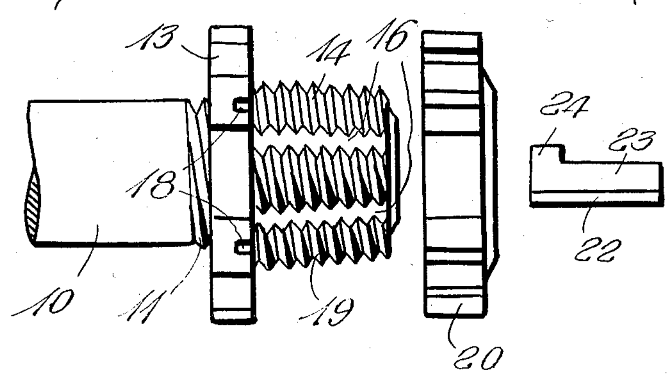
Figure 3:
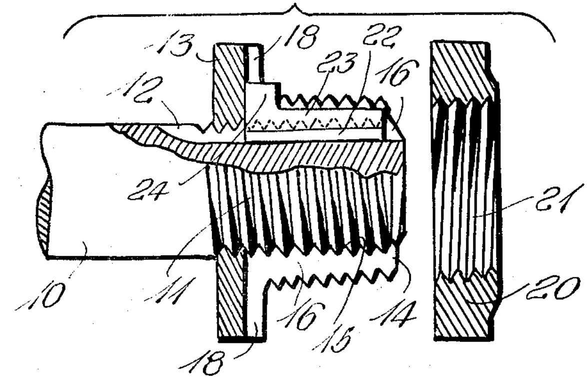

Other and further objects of the invention will become apparent from a reading of the following specification taken in conjunction with the drawings, in which:

Figure 1 is an exploded side elevational view, partly broken away, showing an embodiment of the invention with none of the parts thereof interconnected, Figure 2 is a view similar to Figure 1 but showing a nut, forming a part of the invention, threadably mounted upon a bolt likewise forming a part of the invention, Figure 3 is a view similar to Figures 1 and 2 but further broken away and showing, in addition to the nut, a key, forming a part of the invention, in interlocking position with the nut and bolt, Figure 4 is a view similar to Figure 3 but showing a locking ring, likewise forming a part of the invention, the whole device now being shown in operative locked position upon a bolt, Figure 5 is an end elevational view of Figure 4 taken in the direction of the arrow A, Figure 6 is a sectional view taken along line 6—6 of Figure 4, Figure 7 is a sectional view taken along line 7—7 of Figure 4, Figures 8 to 10, inclusive, are perspective views of three keys utilized in the invention, Figure 11 is a sectional view taken along line 11—11 of Figure 8, and Figure 12 is a partial sectional view similar to Figure 6 wherein a modified form of key is employed.

Referring more particularly to the drawings, there is shown therein a bolt 10 having a threaded outer end 11 and provided with a longitudinally extending groove 12 which extends through and slightly beyond the threaded portion 11.

A nut 13 is provided with an integrally formed tapered sleeve on one face thereof, as indicated at 14, and the nut 13 and sleeve 14 are centrally interiorly threaded, as indicated at 15, whereby the same may be threaded upon the threaded portion 11 of the bolt 10.

The sleeve 14 is provided with a plurality of circumferentially spaced longitudinally extending slots 16, in this case six in number, which slots 16 divide the sleeve 14 into a corresponding number of fingers 17.

Each of the slots 16 communicates at its inner end with a radial groove 18 formed in the adjacent face of the nut 13. The sleeve 14 is exteriorly threaded, as indicated at 19, and a locking ring 20 is provided with an interiorly threaded tapered opening 21 for locking engagement with the threads 19 of the sleeve 14. Both the nut 13 and the locking ring 20 are provided with suitable wrench-engaging elements.

Referring now to Figure 8, there is shown therein an elongated base 22 which is adapted to slidably engage in the groove 12 in the bolt 10. Integrally formed with the base 22 and extending centrally upwardly therefrom is an elongated body 23 which has integrally formed therewith at one end thereof an upwardly extending head 24. In Figure 9 there is shown a key which is a slight modification of that shown in Figure 8 and wherein the body **23*a* and head 24*a* extend upwardly from the right hand edge portion of the base 22, as viewed in the figure. In Figure 10 there is shown another modification wherein the body 23*b* and head 24*b* extend upwardly from the left side portion of the base 22**.

In operation, it will be apparent that the nut 13 is first threaded upon the bolt 10 to the exact position desired after which it is given a further turn in the direction of the nearest radial groove 18 to bring the latter into registry with the longitudinal groove 12 in the bolt 10. This action will, of course, move the nut 13 longitudinally either inwardly or outwardly of the exact position desired but never more than one-twelfth of a revolution of the nut, this last factor being determined by one-half of the circumferential distance between two adjacent radial grooves 18, there being six of the latter. A still further correction of the proper position of the nut 13 may then be made by selecting one of the keys shown in Figures 8, 9 and 10. If the correction is to be made in a counterclockwise direction, then the key shown in Figure 10 may be used in the manner illustrated in Figure 12. If the correction is to be made in a clockwise direction, then the key shown in Figure 9 is used. If no further correction is desired then the key of Figure 8 is utilized.

In any event, the key is moved inwardly into the groove 12 so that the base 22 is engaged in the groove 12 and the body 23, **23*a* or 23*b*, as the case may be is positioned in the slot 16 which is in registry with the body 23, 23*a* or 23*b*. The key is moved inwardly until the head 24, 24*a* or 24*b* as the case may be is received in the radial groove 18 associated with the particular slot 16. The locking ring 20 is then spread into position as far as it will go on the tapered sleeve 14 thus securely locking the lock nut upon the bolt 10** in its most desirable position and against any displacement therefrom.

It will be apparent that when it is desired to disassemble the structure shown and described hereinabove, it is only necessary to first remove the locking ring 20 after which the key may be removed by inserting a sharp pointed instrument into the outer end portion of the radial groove 18 in which the head 24 may be positioned whereby to engage such head and move the same outwardly to disassociate it from the nut 13 and sleeve 14 after which the nut 13 may be removed from the bolt.

It will also be apparent that the head 24 extending as it does radially outwardly with respect to the bolt

10 when it is in proper position, prevents loss of the key through accidental displacement of the same from the groove 12 due to the fact that the head 24 may not pass the locking ring 20.

While but one form of the invention has been shown and described herein, it will be readily apparent to those skilled in the art that many minor modifications may be made without departing from the spirit of the invention or the scope of the appended claim.

What is claimed is:

A device of the character described comprising, in combination with a bolt having a threaded outer end portion and a keyway extending longitudinally through said threaded portion, a nut having a tapered sleeve formed integrally with one face thereof, said nut and sleeve being internally threaded for reception on said bolt, said sleeve having a plurality of circumferentially spaced slots extending longitudinally therethrough, said nut having a plurality of radial grooves each communicating with one of said slots and extending through the outer periphery of said nut, a key having a base slidable in said keyway, said key including a longitudinally and radially outwardly extending body formed integrally with said base and selectively receivable in one of said slots, a head extending outwardly from one end of said body with respect to the base and receivable in the groove associated with the slot in which the body is received, said sleeve having exterior tapered threads, and a locking ring having tapered threads threadably mountable upon said sleeve.

References Cited in the file of this patent

UNITED STATES PATENTS

| | | |
|---|---|---|
| 754,438 | Evans | Mar. 15, 1904 |
| 788,058 | Morrow | Apr. 25, 1905 |

FOREIGN PATENTS

| | | |
|---|---|---|
| 19,436 | Great Britain | Aug. 23, 1897 |
| 2,422 | Great Britain | Jan. 29, 1898 |